United States Patent
Bowden

[11] 3,840,263
[45] Oct. 8, 1974

[54] PORTABLE SEAT FOR TRUCK BODIES
[76] Inventor: Robert G. Bowden, 805 Austin St., Madera, Calif. 93637
[22] Filed: May 23, 1973
[21] Appl. No.: 363,152

[52] U.S. Cl............... 296/10, 296/23 MC, 296/64, 296/99, 280/179 R
[51] Int. Cl............................................. B60n 1/00
[58] Field of Search............ 296/23 MC, 10, 63, 64, 296/99, 138

[56] References Cited
UNITED STATES PATENTS
| | | | |
|---|---|---|---|
| 157,977 | 12/1874 | Shill | 296/138 |
| 3,469,355 | 9/1969 | McGann | 296/64 X |
| 3,684,048 | 8/1972 | Prater | 296/23 MC X |

FOREIGN PATENTS OR APPLICATIONS
| | | | |
|---|---|---|---|
| 300,485 | 11/1928 | Great Britain | 296/99 |

Primary Examiner—Robert B. Reeves
Assistant Examiner—Joseph J. Rolla
Attorney, Agent, or Firm—Larson, Taylor & Hinds

[57] ABSTRACT

A rearwardly facing seat assembly is removably positioned against the front wall of a pick-up truck body and is held in place by adjustable braces which abut the wheel wells above the body floor. The seat assembly includes a bottom member with a seat cushion and back rest, and a canopy member which is hinged to the bottom mamber and may be folded downwardly to cover the seat cushion and back rest when not in use. A removable curtain may be attached to open sides of the canopy member and a warm air duct may communicate the seat assembly with the cab of the truck through the rear window of the cab.

8 Claims, 3 Drawing Figures

PORTABLE SEAT FOR TRUCK BODIES

This invention relates to new and useful improvements in portable seat assemblies for truck bodies, and the principal object of the invention is to provide a simple but highly convenient seat assembly which may be readily installed in the body of a pick-up truck to provide seating space in the latter.

As such, the seat assembly of the invention is placed against the front wall of the truck body and faces rearwardly, being held in place by adjustable braces which abut the usual wheel wells above the body floor. The seat assembly includes a bottom member which contains a seat cushion and a back rest, and a canopy member which is hinged to the bottom member and may be folded downwardly to cover the seat cushion and back rest when not in use. In the folded position of the canopy member, the seat assembly is unobtrusive and may be easily stored away. Also, when not in use in a truck, the seat assembly may be used on beaches or while picnicing or fishing, or as a seat of general utility.

The seat assembly is simple in construction, light in weight, may be made of plastic material, and lends itself to economical manufacture.

With the foregoing more important object and features in view and such other objects and features which may become apparent as this specification proceeds, the invention will be understood from the following description taken in conjunction with the accompanying drawings, in which like characters of reference designate like parts, and in which.

Figure 1:
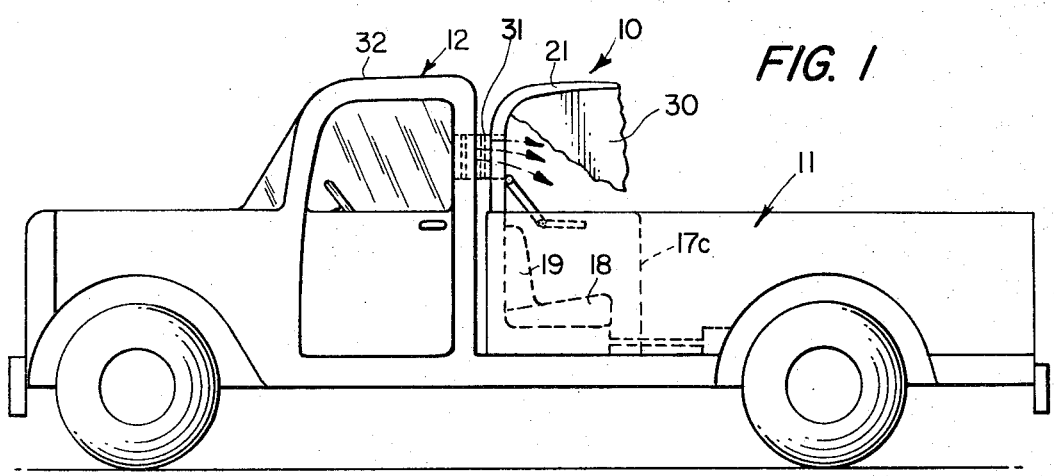
FIG. 1 is a side elevational view of a pick-up truck with the seat assembly of the invention positioned therein.
Figure 2:
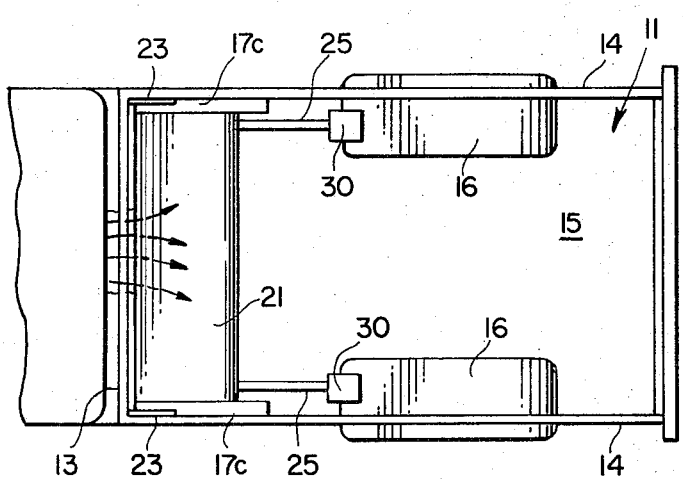
FIG. 2 is a fragmentary top plan view thereof.
Figure 3:
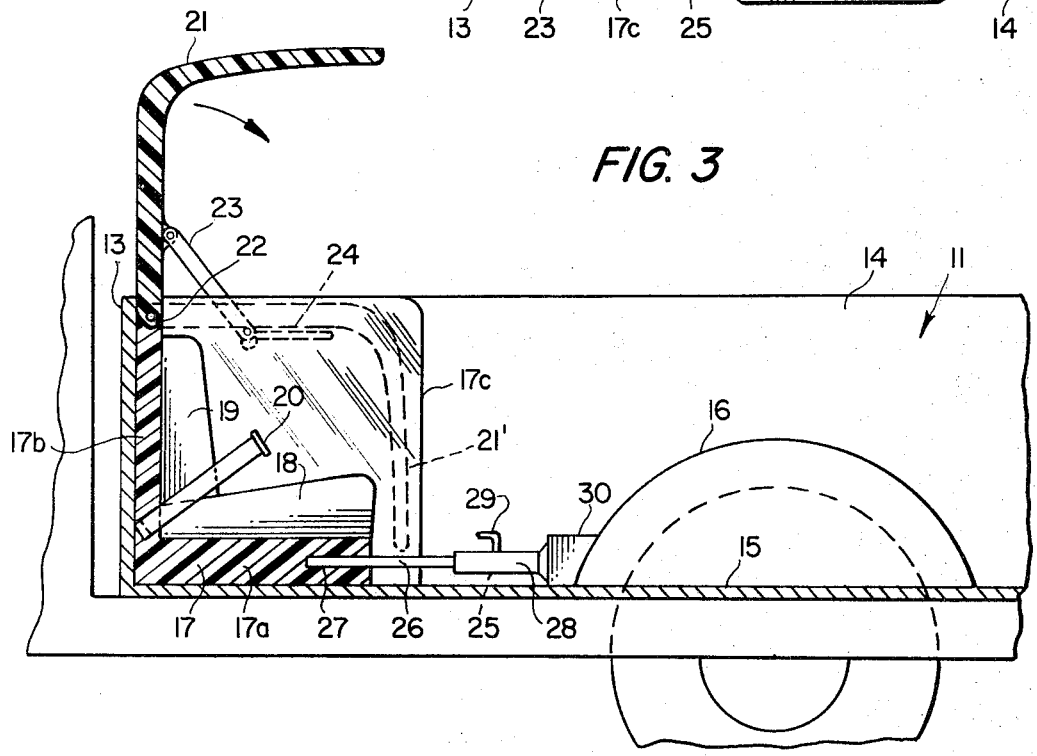
FIG. 3 is a fragmentary, enlarged vertical sectional view.

Referring now to the accompanying drawings in detail, the general reference numeral 10 designates a portable seat assembly of the invention which is especially adapted for removable positioning in the body 11 of a pick-up truck 12. The truck body 11 includes a front wall 13, a pair of sidewalls 14, a floor 15 and the usual pair of wheel wells 16 which project above the floor at the sidewalls 14.

The seat assembly 10 is positioned on the floor 15 against the front wall 13 and faces rearwardly. The assembly includes a bottom member 17 which may be made of fiberglass, or the like, the bottom member having a base portion 17a and a back rest portion 17b. A foam seat cushion 18 is positioned on the base portion 17a and a foam back rest 19 is placed against the back rest portion 17b, as will be readily apparent. One or more seat belts 20 may be provided. The bottom member 17 also includes a pair of sidewalls 17c disposed adjacent the sidewalls 14 of the truck body, it being understood that the seat assembly is about as wide as the inside of the body, in which it fits with sufficient clearance to permit easy installation and removal.

The seat assembly also includes a canopy member 21 made of fiberglass, or the like, the canopy member being substantially L-shaped in vertical section and being hingedly connected to the back rest portion 17b of the bottom member 17, as indicated at 22. When the seat assembly is in use, the canopy member 21 extends upwardly from the bottom member portion 17b and then rearwardly over the bottom member portion 17a, thus providing protection against sun or rain for the occupants of the seat. However, when the seat is not in use, the canopy member 21 may be folded rearwardly and downwardly to cover the seat cushion 18 and back rest 19, as indicated by the dotted lines 21'. Suitable links 23 are pivoted to the sides of the canopy member 21 and have a sliding connection in slots 24 in the sidewalls 17c of the bottom member 17 to guide the pivotal movement of the canopy member, any suitable form of locking means being provided at such links for releasably retaining the canopy member in its raised position.

The entire seat assembly is held in place in the truck body by a pair of adjustable braces 25 which include rods 26 removably inserted in sockets 27 formed in the base portion 17a of the bottom member 17. Sleeves 28 are slidably telescoped on the rods 26, suitable locking screws 29 being provided to lock them in an adjusted position. The sleeves 28 are equipped with blocks 30 which abut the wheel wells 16 when the braces are extended, thus holding the seat assembly in place when they are locked by the screws 29. When the seat assembly is to be removed from the truck, the braces are unlocked and shortened out of engagement with the wheel wells, whereupon removal of the seat assembly is readily facilitated. The canopy member 21 may then be folded and the braces 25 removed from the sockets 27, thus permitting the device to be easily stored in a small space.

Apart from the foregoing basic features, the seat assembly may also include additional refinements, such as a curtain, shown in part in FIG. 1 at 30. The canopy member 21 has open sides and an open back, and the curtain may be attached to the sides and back of the canopy member, as by snap fasteners, or the like, so as to protect the occupants of the seat against adverse weather.

Also, the canopy member may be provided with an opening and a warm air duct 31 may be extended from this opening to the usual back window of the truck cab 32, so that when the window is open, warm air may flow from the cab into the seat assembly. The curtain 30, of course, should be used in conjunction with such an air duct to retain the warm air in the seat.

While in the foregoing there has been described and shown the preferred embodiment of the invention, various modifications and equivalents may be resorted to within the spirit and scope of the invention as claimed.

What is claimed as new is:

1. For use in a pick-up truck body having a floor, a front wall, a pair of sidewalls and a pair of wheel wells projecting above the floor at the side walls; a rearwardly facing seat assembly removably installable in the truck body, said seat assembly comprising a bottom member having a substantially flat bottom surface for resting on the truck body floor and a substantially flat back surface for abutting against the front wall of the truck body, a seat cushion and a back rest provided in said bottom member, and a canopy member hingedly connected to said bottom member, said canopy member extending upwardly above said back rest and rearwardly with respect to said truck body over said seat cushion in a first, in use position thereof, and positionable about the hinged connection rearwardly and downwardly to a second, stored position in which said canopy member covers said seat cushion and said back rest.

2. The device as defined in claim 1 and further comprising retaining means for retaining said bottom member in abutting relationship with the front wall of the truck body.

3. The device as defined in claim 2 wherein said retaining means comprises adjustable braces projecting rearwardly from said bottom member and adapted to engage the wheel wells.

4. The device as defined in claim 1 wherein said bottom member of said seat assembly includes a base portion and a back rest portion respectively supporting said seat cushion and said back rest.

5. The device as defined in claim 1 which is further characterized in that said canopy member of said seat assembly is substantially L-shaped in vertical section.

6. The device as defined in claim 5 wherein said canopy member is comprised of a unitary substantially rigid member.

7. The device as defined in claim 1 together with a curtain removably attached to and depending from said canopy member.

8. The device as defined in claim 1 together with a warm air duct adapted to extend between and communicate with said canopy member and the rear window of a truck cab.

* * * * *